D. S. HALL.
COMB FRAME FOR BEEHIVES.
APPLICATION FILED FEB. 23, 1921.
1,423,212.                                    Patented July 18, 1922.
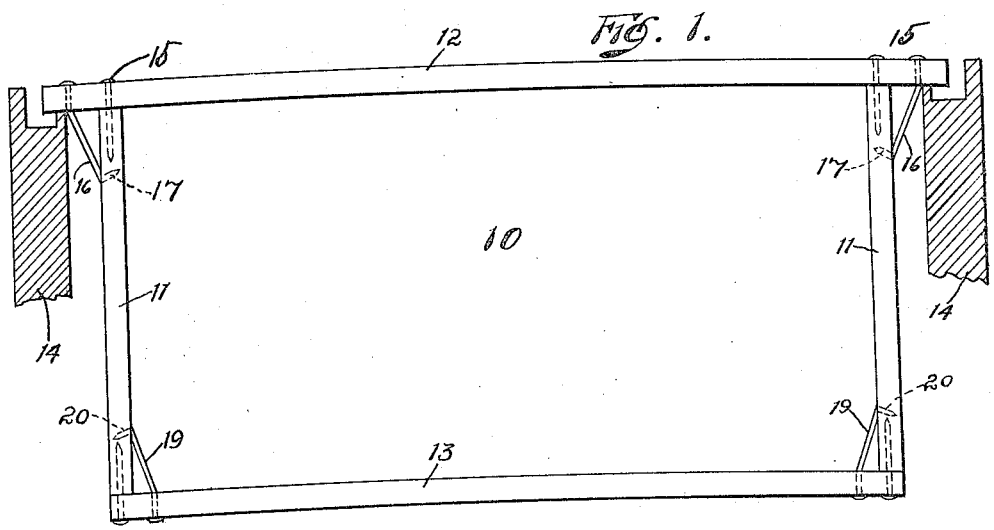
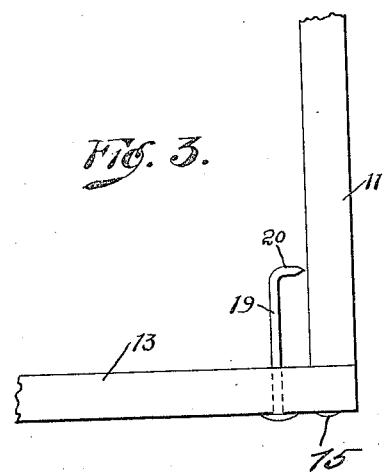
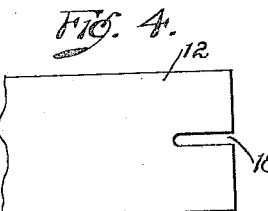
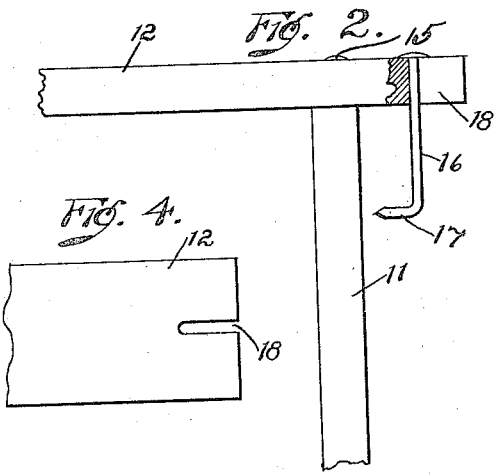
D. S Hall, INVENTOR.
BY Watson E. Coleman
ATTORNEY.

UNITED STATES PATENT OFFICE.

DEAN S. HALL, OF MARSHFIELD, VERMONT.

COMB FRAME FOR BEEHIVES.

1,423,212.  Specification of Letters Patent.  Patented July 18, 1922.

Application filed February 23, 1921. Serial No. 447,144.

*To all whom it may concern:*

Be it known that I, DEAN S. HALL, a citizen of the United States, residing at Marshfield, in the county of Washington and State of Vermont, have invented certain new and useful Improvements in Comb Frames for Beehives, of which the following is a specification, reference being had to the accompanying drawings.

This invention relates to beehives, and particularly to a certain detailed construction of the frame wherein the honey comb is formed.

In ordinary frames such as are commonly used in hives, the top cross bar upon which the honey comb is supported is made of relatively thick material. Ordinarily this top cross bar is $\frac{7}{8}''$ thick and the object in making it of this thickness is to prevent the bar from sagging in the middle under the weight of the honey. In ordinary comb frames, in order to space the frame from the end walls of the hive, staples are driven into the end members of the frame just below the top cross bar, these staples projecting laterally, and by contact with the inner faces of the end walls of the hive properly spacing the comb frame from the hive and holding it in such relation that bees may pass around the exterior of the comb frame between the ends of the comb frame and the wall of the hive.

One of the objects of my invention is to provide means for connecting either the top or the bottom cross bar or both of the frame to the depending end bars of the frame which will permit the upper or lower cross bars of the frame to be made of relatively light material but which will prevent these relatively light cross bars from sagging under the weight of honey, this means at the same time constituting the means whereby the comb frames are spaced properly from the end walls of the hive.

A further object is to so form this attaching means between an end member and the top cross bar of the frame that the guide and spacer so formed is inclined downward and laterally so that the frame will naturally settle into correct position when the frame is placed in the hive and without any trouble or attention.

My invention is illustrated in the accompanying drawings, wherein:—

Figure 1 is a fragmentary sectional view of a portion of a beehive with my improved comb supporting frame therein, the frame being in elevation;

Figure 2 is a fragmentary elevation of one corner of the frame shown in Figure 1, showing a modified manner of engaging the nail 16 with the cross bar 12;

Figure 3 is a fragmentary elevation of a lower corner of the frame before the nail 19 is driven in;

Figure 4 is a top plan view of the cross bar 12 shown in Figure 2.

Referring to these drawings, 10 designates the comb frame such as used in hives and comprising the end bars 11, the top cross bar 12 and the bottom cross bar 13. The top cross bar projects beyond the end bars 11 so as to form a hanger or support which engages with the upper ends of the end walls 14 of the hive. The end bars 11 of the frame are ordinarily connected to the top cross bar 12 by means of vertically disposed nails, screws, or other attaching devices 15. So far I have described the ordinary construction of a comb frame.

My invention consists in disposing through the projecting ends of the cross bar 12 a nail or equivalent attaching device 16. This nail after it is driven through the top cross bar, as illustrated in Figure 2 is laterally bent, as at 17. Then this angularly bent end is driven into the wood of the end member 11, as illustrated in Figure 1, which causes that portion of the nail 16 below the cross bar to be downwardly and inwardly inclined, while its angular pointed extremity 17 is upwardly and inwardly inclined. By angularly bending the nail inward in this manner and driving it as disclosed in Figure 1, the nails as they are driven act to draw downward upon the outer projecting ends of the cross bar 12 and thus cause this cross bar to be slightly curved upwardly or "crowned." Of course, the upward bowing of the cross bar will draw very slightly inward on the vertical members 11, but this movement of the vertical members 11 is so slight as to be inappreciable. This is the natural result of driving the nails 16 as indicated. It will be obvious now that any weight placed upon this top cross bar tends to draw the outer ends of the cross bar upward, which is resisted by the nails 16, so that any weight, as for instance the weight of the honey comb applied to the top cross bar, will not cause this cross bar to sag. This is even more fully resisted by crowning the cross bar as described through the driving in of the nails 16. Then the weight of the comb applied to the cross bar will simply tend at the best to partially straighten or flatten the crown of the cross bar but it will never cause the cross bar to sag.

While preferably the nails 16 are driven through the projecting ends of the cross bars, then angularly bent by hand, and then driven into the end bars 11, yet a quicker means of applying the nails would be to form kerfs 18 in the ends of the cross bars, as illustrated in Figure 4, and have the nails 16 angularly bent prior to driving them. Then the head of the nail is simply inserted in the kerf or cut 18 and the angular end of the nail is driven in in the manner heretofore described. This does not in any way affect the principle of my invention but simply shows another manner in which it might be used where hives are made in large quantities and hand work is to be avoided as much as possible.

The nails 16 when finally set, as illustrated in Figure 1, not only additionally attach the top cross bar to the vertical end bars 11 and prevent sagging of the cross bar, but these nails 16 also act as spacers between the end members 11 and the inside faces of the end walls 14 of the hive, and further inasmuch as the nails 16 are downwardly and inwardly inclined, it is obvious that they will automatically guide the comb frame into proper spaced relation to the end walls of the hive by merely dropping the comb frame in, the inclined faces of the nails acting to shift the comb frame to its middle position and this is done without the necessity of any manual adjustment of the frames at all.

Not only may this means of attachment be applied to the top bar of the frame, but it may also be applied to the bottom bar 13 of the comb frame. Here also there is a chance for the lower bar 13 to sag under the weight of honey unless this lower bar be made relatively thick, but my lower bar 13 is of relatively thin material approximately $\frac{3}{8}''$ thick and is held from sagging by the nails 19 which are driven upward through the cross bar 13 inward of the end bars 11 but adjacent thereto and is then angularly bent at 20, and then this angularly bent terminal end is forced into the wood of the bar 11, thus causing the nails to draw upward on the middle of the bar 13 so that this bar also is slightly crowned and its sagging is fully resisted.

Ordinarily the top bars of comb frames are made $\frac{7}{8}''$ thick in order to overcome the tendency to sag. With my device, however, these top bars may be made only $\frac{3}{8}''$ thick and they will not sag when loaded with honey. It will be seen that this is also true of the lower bar 13, which may be made only $\frac{1}{4}''$ thick, and it will be noted that the half inch of space which is saved by reducing the thickness of the top bar provides additional comb space, thereby adding to the capacity of the frame for comb and for honey. In other words, the frame may be made slightly larger than it ordinarily could be for the same size hive. The corners of the frame are greatly strengthened by the use of this attaching device and the life of the frame is materially lengthened, as my attaching devices tend to prevent the top bar of the frame from being pulled off when being removed from the hive filled with honey. It is quite common for these top bars to pull off the frames of ordinary comb frames.

While I have illustrated an ordinary large headed nail as a connecting means between the top and bottom bars and the end bars of the frame, I do not wish to be limited to the use of a nail proper, as any other piece of metal which will have the same function might be used and this fastening device might be modified in many ways without departing from the principle of the invention as defined in the appended claims.

I claim:—
1. A comb frame including end bars and a top bar, the top bar extending beyond the end bars and being attached thereto, the ends of the top bar being longitudinally slotted, and connecting means between the projecting ends of the top bar and the end bars comprising members having their upper ends extending through said slots and having heads on their upper ends greater in area than the width of the slots, the lower ends of said members extending into the end bars and resisting upward movement of the projecting ends of the cross bar.

2. A comb frame including end bars and a cross bar, fastening devices connecting the end bars to the cross bar, and means for preventing sagging of the cross bar comprising metallic members at each end of the cross bar extending through the cross bar in spaced relation to the end bars and angularly bent at their extremities and driven into the end bars, that portion of the member between its point of emergence from the cross bar and its point of entry into the end bar being angularly disposed with reference to the end bar.

3. A comb frame including end bars, a cross bar projecting beyond the end bars, fastening nails passing through the cross bar and into the ends of the end bars, and fastening members each having a head and a shank, the shank extending through the projecting ends of the cross bar and having angularly bent, pointed extremities driven into the end bars, the portion of the shank between the projecting ends of the cross bar and the end bars being inclined downward and toward the end bars to thereby form a spacing member and a guide.

4. A comb frame having end bars and an upwardly curved cross bar.

5. A comb frame including end bars, a cross bar extending beyond the end bars and attached thereto, and means connecting the end bars and the cross bar causing the cross bar to be upwardly curved.

6. A comb frame including end bars, a top cross bar attached to the upper ends of the end bars and projecting beyond the end bars, a bottom cross bar terminating at the end bars and attached thereto, members passed through the projecting ends of the top cross bar and driven into the end bars and drawing the projecting ends of the top cross bar downward to thereby upwardly curve the middle of the cross bar, and members passing through the bottom cross bar and having their terminal ends angularly bent and driven into the end bars and acting to draw the middle of the lower cross bar upward and acting to prevent the sagging of the lower cross bar.

7. A comb frame comprising end bars and a transverse bar, and means engaging the ends of the transverse bar and the end bars and drawing the transverse bar upward at its middle.

8. A comb frame comprising end bars, upper and lower transverse bars, and means connecting the end and transverse bars at the corners of said frame and holding said transverse bars in an upwardly bowed position.

In testimony whereof I hereunto affix my signature.

DEAN S. HALL.